United States Patent
Abiru et al.

(10) Patent No.: US 6,839,358 B2
(45) Date of Patent: Jan. 4, 2005

(54) RELAYING APPARATUS

(75) Inventors: Kenichi Abiru, Kawasaki (JP); Kensaku Amou, Kawasaki (JP); Yan Xu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 740 days.

(21) Appl. No.: 09/808,093

(22) Filed: Mar. 14, 2001

(65) Prior Publication Data

US 2002/0061027 A1 May 23, 2002

(30) Foreign Application Priority Data

Nov. 22, 2000 (JP) ........................................ 2000-356500

(51) Int. Cl.⁷ .............................................. H04L 11/20
(52) U.S. Cl. ..................................... 370/413; 370/468
(58) Field of Search .............................. 370/395.4, 386, 370/413, 414, 429, 468

(56) References Cited

U.S. PATENT DOCUMENTS

| | | | | |
|---|---|---|---|---|
| 5,742,606 A | * | 4/1998 | Iliadis et al. | 370/413 |
| 5,748,629 A | * | 5/1998 | Caldara et al. | 370/413 |
| 5,867,663 A | * | 2/1999 | McClure et al. | 370/413 |
| 5,912,889 A | * | 6/1999 | Preas et al. | 370/414 |
| 5,996,019 A | * | 11/1999 | Hauser et al. | 370/429 |
| 6,426,957 B1 | * | 7/2002 | Hauser et al. | 370/413 |
| 6,532,234 B1 | * | 3/2003 | Yoshikawa et al. | 370/395.4 |
| 6,611,519 B1 | * | 8/2003 | Howe | 370/413 |
| 6,667,984 B1 | * | 12/2003 | Chao et al. | 370/414 |

FOREIGN PATENT DOCUMENTS

JP  2000-151703  5/2000

* cited by examiner

Primary Examiner—Salvatore Cangialosi
(74) Attorney, Agent, or Firm—Katten Muchin Zavis Rosenman

(57) ABSTRACT

In a relaying apparatus comprising input side accommodating portions including input side queues, a plurality of output side accommodating portions including output side queues, and a switch fabric for mutually connecting the input side queues and the output side queues in a mesh form, in a time slot of a fixed period, the output side-addressed queue managers corresponding to the output side accommodating portions select a bandwidth guaranteed packet so as to guarantee a bandwidth, and output priority/non-priority signals for indicating which of the bandwidth guaranteed packet and a bandwidth non-guaranteed packet has been selected, and output demand signals of the packet. An inter-output link manager selects the packet having an empty area in the priority queue or non-priority queue of the output side accommodating portion as a destination corresponding to the packet which is demanded to be outputted.

12 Claims, 14 Drawing Sheets

OUTPUT ALLOCATION OF INPUT SIDE ACCOMMODATING PORTION

INTPUT ALLOCATION OF OUTPUT SIDE ACCOMMODATING PORTION

RELAYING APPARATUS

BACKGROUND OF THE INVENTION

1. Field of the Invention

The present invention relates to a relaying apparatus, and in particular to a relaying apparatus comprising input side accommodating portions including input side queues, a plurality of output side accommodating portions respectively including output side queues, and a switch fabric for mutually connecting the input side queues and the output side queues in a mesh form.

A relaying apparatus such as a router accommodating a plurality of networks and relaying packets between the networks receives the packet from the input side network, determines the output side network for the packet, and performs routing for the transmission of the packet to the determined network.

In such a relaying apparatus, it is possible that the packets are simultaneously transmitted to a single output side network from a plurality of input side networks. Thus, the issue of the competition of scrambling for the output side network occurs. This issue can be solved by temporarily queuing the packets. However, what kind of queuing method should be adopted is important for the performance of the relaying apparatus.

2. Description of the Related Art

FIG. 10 shows an arrangement of a general relaying apparatus. This relaying apparatus is composed of an input side accommodating portion 10 for determining output destinations of packets 61_1–61_N (hereinafter, sometimes generally represented by reference numeral 61) inputted from the network, a switch fabric 40 for transferring packets 62_1–62_N (hereinafter, sometimes generally represented by reference numeral 62) received from the input side accommodating portion 10 to predetermined output destinations, and an output side accommodating portion 50 for outputting packets 63_1–63_N (hereinafter, sometimes generally represented by reference numeral 63) received from the switch fabric 40.

The input side accommodating portion 10 is composed of input side accommodating portions 10_1–10_N having the same arrangement, and the output side accommodating portion 50 is composed of output side accommodating portions 50_1–50_N having the same arrangement.

The input side accommodating portions 10_1–10_N and the output side accommodating portions 50_1–50_N are logically connected by the switch fabric 40 in a full mesh form. Thus, the relaying apparatus transfers the packets inputted to the input side accommodating portions 10_1–10_N to the predetermined output side accommodating portions 50_1–50_N based on transfer information thereby realizing the packet relay between different networks.

Accordingly, a physical link 62_1, wherein the same reference numeral as the packet 62_1 is used in FIG. 10, the other physical links 62_2–62_N are likewise applied, and hereinafter, these reference numerals 62_1–62_N are sometimes generally represented by reference numeral 62, connecting the input side accommodating portion 10_1 and the switch fabric 40, for example, is multiplexed with logical links connecting the input side accommodating portion 10_1 and the output side accommodating portions 50_1–50_N. The same may also apply to the physical links 62_2–62_N.

Also, physical links 63_1–63_N, wherein the same reference numerals as the packets 63_1–63_N are used in FIG. 10, connecting the switch fabric 40 and the output side accommodating portions 50_1–50_N are multiplexed with logical links connecting the output side accommodating portions 50_1–50_N and the input side accommodating portions 10_1–10_N.

As mentioned above, the relaying apparatus performs a queuing of the packets addressed to the same output side network, and the queuing is classified into three categories according to a physical location of a buffer (queue); the location of the output side queue (buffer) resides in the input side accommodating portion 10, in the switch fabric 40, or in the output side accommodating portion 50.

Scheduling at Input Side Accommodating Portion

FIG. 11 shows an arrangement of general input side accommodating portions 10_1–10_N (hereinafter, sometimes generally represented by reference numeral 10).

Each of the input side accommodating portions 10 includes a destination determining/flow identifying portion 12 which determines the destination of the packet 61 received from the network through an interface 11 and identifies the packet flow to output packet information 65 as well as a packet 61a, an input side scheduler 13, and an interface 14 which interfaces, with the input side scheduler 13, empty/full information 81_1–81_N (hereinafter, sometimes generally represented by reference numeral 81) indicating whether or not the output side queue (not shown in FIG. 11) of the switch fabric 40 (see FIG. 10) is empty, and which interfaces, with the switch fabric 40, the packet 62 from the scheduler 13.

The input side scheduler 13 includes a plurality of input side queues (not shown), allocates the received packets 61a to the queues to be stored based on the packet information 65, and performs scheduling, that is determining the order of transferring the packets 61a stored in the input side queues as the packets 62 based on the empty/full information 81.

In the absence of enough input bandwidth of the output side accommodating portion 50_1 for the total bandwidth of the packets addressed to the output side accommodating portion 50_1 from all of the input side accommodating portions 10, for example, a competition occurs among the packets 63_1 addressed to the output side accommodating portion 50_1 from the input side accommodating portions 10. Therefore, the competition control is required.

Similarly, in the absence of enough input bandwidth of the output side accommodating portions 50_2–50_N, the competition controls among the packets 63_2–63_N are respectively required.

In case the input side accommodating portion 10 which has received the empty/full information 81 (or output disabling notification 81) from the output side accommodating portion 50 performs the queuing as a result of the competition control for the packets 63 in the output side accommodating portions 50, so-called Head of Line Blocking occurs.

Namely, taking as an example that the packets addressed to the different output side accommodating portions 50 are queued in the same queue, if the packet addressed to the output side accommodating portion 50_1 is waiting at the head of the queue, and the output side queue of the output side accommodating portion 50_1 is full, the following packet addressed to the output side accommodating portion 50_2 is blocked and therefor can not be outputted although the packet input to the output side accommodating portion 50_2 is possible.

As prior art to avoid this disadvantage, a method in which VOQ (Virtual Output Queue: queue for each of output side accommodating portions 50_1–50_N) is provided in each of the input side accommodating portions 10 for controlling is known.

Scheduling at Switch Fabric

Priority/non-priority queues arranged at the output side of the switch fabric 40 can be regarded as being arranged at the input side of the output side accommodating portions 50, if an input of a bandwidth guaranteed packet to the priority queue can be guaranteed by suppressing an input of a bandwidth non-guaranteed packet to the non-priority queue in the generation control of the empty/full information (indicating whether or not there is an empty area in each of the priority or non-priority queues) of the queues. Therefore, this scheduling is the same as the scheduling at the output side accommodating portion described below.

Scheduling at Output Side Accommodating Portion

Each of the output side accommodating portions 50 for accommodating the output side network is provided with a plurality of output side queues corresponding to the kinds of the packets, and allocates the inputted packets to the corresponding output side queues to be stored. Each of the output side accommodating portions 50 performs an inter-queue read-out scheduling for reading the packets from the output side queues to the output side network.

If the above-mentioned scheduling is organized, the scheduling of the entire relaying apparatus is composed of the following steps (1)–(3):

(1) Scheduling including the control among VOQ's, at the input side accommodating portion 10.

(2) Scheduling among a plurality of input side accommodating portions for each output side accommodating portion, at the switch fabric 40.

(3) Scheduling among a plurality of queues concerning the network to which the packets are outputted, at the output side accommodating portion 50.

The scheduling enables the relaying apparatus to guarantee the bandwidth which is one of the service qualities in one or more packet flows.

Namely, the relaying apparatus sets a reservation bandwidth for each packet flow, and identifies the packet flow, and then may perform the scheduling of the transfer (transmission) process of the packet flow, that is, the transfer controls between the input side accommodating portion 10 and the switch fabric 40, as well as between the switch fabric 40 and the output side accommodating portion 50, and the packet output control to the network at the output side accommodating portion 50, so as to guarantee the reservation bandwidth.

As for the scheduling of the input side accommodating portion 10, the switch fabric 40, and the output side accommodating portion 50, there are following prior art examples (1)–(4) and the like:

Prior Art Example (1)

For example, there is a method in which the entire relaying apparatus manages the time slot, and each of the input side accommodating portions 10 fixedly allocates the time slot to the queue corresponding to each of the output side accommodating portions 50 in order to secure the bandwidth between the input side accommodating portions. In this case, in order to prevent the packets to the same output side accommodating portion from mutually competing, the packet output timings (time slots) of all the input side accommodating portions 10 are preliminarily shifted for the allocation.

This prior art packet transfer timing will now be described referring to timing charts shown in FIGS. 12A and 12B.

In FIGS. 12A and 12B, the relaying apparatus manages the timing of the entire apparatus with a fixed period "T" divided into time slots TS1–TSN. In FIG. 12A, the time slots TS1–TSN are respectively allocated to the input side queues of the packets addressed to the output side accommodating portions 50_1–50_N in the input side accommodating portion 10_1, the time slots TS2–TSN and TS1 are respectively allocated to the input side queues in the input side accommodating portion 10_2, and similarly time slots are allocated to the input side queues in the input side accommodating portions 10_3–10_N with mutually shifted states.

Thus, since the packets addressed to the output side accommodating portion 50_1 queued at the input side accommodating portions 10_1–10_N, for example, are sequentially transferred in the order of the time slots TS1–TSN, they do not compete with each other. The same may apply to the packets addressed to the output side accommodating portions 50_2–50_N.

FIG. 12B shows a case where the packet reception is viewed from the output side accommodating portions 50_1–50_N. The output side accommodating portion 50_1, for example, receives the packets from the input side accommodating portions 10_1–10_N respectively in the time slots TS1–TSN, so that no competition of the packets occurs. The same may apply to the output side accommodating portions 50_2–50_N.

As seen from FIGS. 12A and 12B, between the input side accommodating portions 10 and the output side accommodating portions 50, the transferable bandwidths of the physical links 62 and 63 (see FIG. 10) are equally divided by the number (=N) of the output side accommodating portions 50, so that the bandwidths of the physical links 62 and 63 are equal. If this bandwidth is assumed to be "R", the bandwidth which can be secured between e.g. the input side accommodating portion 10_1 and the output side accommodating portion 50_1 is R/N at most. The bandwidths between the other input side accommodating portions 10 and the other output side accommodating portions 50 are the same.

FIG. 13 shows an arrangement of the input side scheduler 13 in the prior art input side accommodating portion 10 shown in FIG. 11. The scheduler 13 includes input side queues 22_1–22_N (hereinafter, sometimes generally represented by reference numeral 22) for selecting the packet 61a according to each packet addressed to the output side accommodating portion to be queued, and queue managers 21_1–21_N (hereinafter, sometimes generally represented by reference numeral 21) addressed to the output sides 50_1–50_N for performing the scheduling as follows; scheduling parameters 66_1–66_N (hereinafter, generally represented by reference numeral 66) and output demanding queue No. (number) signals 86_1–86_N (hereinafter, sometimes generally represented by reference numeral 86) are respectively transmitted/received to/from the input side queues 22 and packets 61b_1–61b_N are outputted from the input side queues 22.

Furthermore, the scheduler 13 includes a selection controller 23 for providing output instruction signals 82_1–82_N instructing the output of the packets to the queue managers 21_1–21_N and for providing an output designation signal 71 to the interface 14 based on the received empty/full information 81, and a selector 24 for selecting any one of the packets 61*b*_1–61*b*_N and for outputting it as the packet 62 based on the output designation signal 71. Also, reservation bandwidth setting signals 84_1–84_N for preliminarily setting the bandwidths of the packet flows are respectively inputted to the queue managers 21 addressed to the output side (hereinafter, abbreviated as output side-addressed queue manager(s)).

The arrangements of the output side-addressed queue manager 21 and the input side queue 22 shown in FIG. 13 will now be described referring to FIG. 14.

The input side queue 22 is composed of an enqueue processor 31, a queue state storage 32, and a dequeue processor 33.

The enqueue processor 31 inputs the packet 61*a* to the queue state storage 32 based on the packet information 65 (output destination identifier 65_1 and flow identifier 65_2). The queue state storage 32 stores the packet 61*a* in the corresponding queue according to whether the packet 61*a* is a packet requiring the bandwidth guaranteeing or a best-effort service packet not requiring the bandwidth guaranteeing, and provides the scheduling parameter 66 and empty/full information 68 for all the queues to the output side-addressed queue manager 21.

The dequeue processor 33 receives the packet 61*b* to be dequeued from the storage 32 based on the output demanding queue No. signal 86 received from the queue manager 21 and provides the same to the selector 24 (see FIG. 13).

The output side-addressed queue manager 21 performs the scheduling of the packets inputted to the input side queue 22 based on the empty/full information 68 of each queue and the scheduling parameter 66.

FIG. 15 shows timings (time slots) in which the selection controller 23 shown in FIG. 13 selects any of the output side-addressed queue managers 21_1–21_N respectively by the output instruction signals 82_1–82_N. The time slots TS1–TSN are the same as those shown in FIG. 12.

FIG. 16 shows an algorithm by which the selection controller 23 selects the queue manager 21. This algorithm will now be described by referring to FIG. 15 based on the operation of the selection controller 23 at the input side accommodating portion 10_1.

Step S40: The time slot No. TS# is assumed to be "1". This No. "1" indicates the Nos. of the time slot TS1, the output side accommodating portion 50_1, and the queue manager 21_1.

Step S41: When the empty/full information 81_1 (see FIG. 13) indicates "empty" for the queue at the output side accommodating portion 50_1, the process proceeds to step S42, and otherwise proceeds to step S43.

Step S42: The selection controller 23 provides the output instruction signal 82_1 to the selected queue manager 21_1. Thus, the queue manager 21_1 corresponding to the output side accommodating portion 50_1 is selected in the time slot TS1 (see time slot TS1 in FIG. 15).

Step S43: The time slot No. TS# is incremented by "1" to proceed to the next time slot TS2. The output side accommodating portion 50_2 and the queue manager 21_2 correspond to the time slot TS2.

Step S44: Since the time slot No. TS# is "2", which is less than N+1, the process returns to step S41. The same procedure is repeated. When step S42 is passed, the queue manager 21_2 corresponding to the output side accommodating portion 50_2 and the queue manager 21_3 corresponding to the output side accommodating portion 50_3 are respectively selected in the time slots TS2 and TS3 (see time slots TS2 and TS3 in FIG. 15).

Furthermore, when the process returns to step S41 in the time slot TS4, and it is assumed that the empty/full information 81_4 does not indicate "empty", the queue manager 21_4 is not selected since the output instruction signal 82_4 is not outputted, so that the process proceeds to step S43 (see time slot TS4 in FIG. 15).

After repeating the same procedure, in case there are empty areas in the queues of the output side accommodating portions 50_1–50_N respectively in the time slots TS1–TSN, the selector controller 23 instructs the output side-addressed queue managers 21_1–21_N to transmit the selected packets by the output instruction signals 82_1–82_N.

It is to be noted that the selector controllers 23 of the input side accommodating portions 10_2–10_N perform the same operation, while the selection controllers 23 of the input side accommodating portions 10_2–10_N respectively select the output side-addressed queue managers 21 corresponding to the output side accommodating portions 50_2–50_N in the time slot TS1, and avoid selecting the same output side accommodating portion 50 in the same time slot.

Prior Art Example (2)

The prior art example in which the switch fabric 40 (see FIG. 10) performs scheduling by the time slot allocation will now be described.

In FIG. 10, the input side accommodating portions 10_1–10_N include the queues for the output side accommodating portions 50_1–50_N, and output transfer demand signals to the switch fabric 40. The switch fabric 40 performs an adjustment (scheduling) for the transfer demands of the input side accommodating portions to select the transfer demand, and outputs a transfer enabling signal to the selected transfer demand. According to the transfer enabling signal, the input side accommodating portion 10 transfers the packet to the switch fabric 40.

Prior Art Example (3)

In a priority reservation scheduler mentioned in the Japanese Patent Application Laid-open No. 2000-151703, it has been remarked that the packet accompanied by a connection-oriented signaling such as a voice in the prior art example (2) is a traffic which can preliminarily anticipate the existence and arrival of the packet, so that the traffic is recognized and a scheduling according to a reserved priority degree is performed.

Prior Art Example (4)

As a scheduler for a single network in the output side accommodating portion 50, that is, as a means in which the packets waiting for the transmission are allocated for each packet flow, and managed by a plurality of queues, and the scheduling between the queues is performed for the bandwidth guaranteeing, various kinds of algorithms such as WFQ (Weight Fair Queue) have been proposed.

It is devised that these algorithms are applied for the entire scheduling algorithm for controlling a plurality of queues for each of the output side accommodating portions in the input side accommodating portion.

The packet scheduler of the above-mentioned prior art (1) fixedly allocates the time slots in order to secure the bandwidth at the input side accommodating portions 10 and the output side accommodating portions 50. In case there is no pocket to be outputted in the queue and the empty/full information indicates full since a congestion occurs in the process of the output side accommodating portion 50 at the packet output destination and the network, an empty bandwidth will be generated in the allocated time slot. Namely, there is a problem that the bandwidth in the output from the input side accommodating portion 10 to the switch fabric 40 can not be efficiently used.

Also, since the transferable bandwidth "R" of the physical link 62 which connects the input side accommodating portion 10 to the switch fabric 40 is equally divided by the number of the output side accommodating portions (=N) in order to secure the bandwidth between the input side accommodating portions 10 and the output side accommodating portions 50, there is a problem that the secured bandwidth between the input side accommodating portions 10 and the output side accommodating portions 50 becomes equal to or less than R/N.

In the method in which the scheduling is concentratedly performed at the switch fabric 40 of the prior art example (2), it is comparatively easy to compose the scheduler at the input side accommodating potion 10. However, there is a problem that it is necessary for all of the input side accommodating portions 10 to transmit the various kinds of packet information to the switch fabric 40, so that the scheduling of the switch fabric 40 becomes complicated, the hardware scale becomes large, and the cost increases.

The method for performing the priority reservation in the prior art example (3) can be applied only to the case where the existence and arrival of the packet can be anticipated by signaling. Accordingly, this method can not be applied to the (connectionless) packet which does not set up the connection before the data transmission. Namely, as for such a packet, it is impossible to anticipate its existence and arrival, so that the bandwidth can not be preferentially reserved.

In the method of the prior art example (4), the physical link 62 from the input side accommodating portion 10 is multiplexed (shared) with the logical link connecting the output side accommodating portions 50_1–50_N as mentioned in the description of FIG. 10, different from a single network of the output side accommodating portion 50.

Accordingly, since the number of the queues to be controlled as well as the calculation amount of the packet output schedule time and the like increase, there is a problem that it becomes difficult to secure the process rate corresponding to the rate of the physical link 62 by the applied scheduling algorithm.

Furthermore, there is a problem that each of the input side accommodating portions independently increases the output bandwidth by performing WRR (Weighted Round Robin) and WFQ among a plurality of queues having different output destinations depending on the congestion state or the like of the output destination link (network) whereby a congestion state of the physical link 63 may be introduced since the input physical links 63 of the output side accommodating portions 50 are shared with all of the input side accommodating portions 10.

SUMMARY OF THE INVENTION

It is accordingly an object of the present invention to provide a relaying apparatus comprising input side accommodating portions including input side queues, a plurality of output side accommodating portions respectively including output side queues, and a switch fabric for mutually connecting the input side queues and the output side queues in a mesh form, efficiently utilizing a transfer bandwidth of a physical link which connects the input side accommodating portions and the switch fabric, and guaranteeing a reservation bandwidth for a packet relay.

In order to achieve the above-mentioned object, in a relaying apparatus of the present invention according to claim 1, each of the input side accommodating portions includes; output side-addressed queue managers provided corresponding to each output side accommodating portion as a destination which select, upon a selection of a bandwidth guaranteed packet or a bandwidth non-guaranteed packet, the bandwidth guaranteed packet so as to guarantee a bandwidth, and which output a priority/non-priority signal for indicating which of the bandwidth guaranteed packet and the bandwidth non-guaranteed packet has been selected, and an output demand signal for demanding an output of the selected packet, and an inter-output link manager which, in a time slot of a fixed period, selects any of the output side-addressed queue managers in which a corresponding output side accommodating portion as a destination has an empty area in its priority queue when the output demand signal is outputted and the priority/non-priority signal indicates priority, or selects any of the output side-addressed queue managers in which a corresponding output side accommodating portion as a destination has an empty area in its non-priority queue when the output demand signal is outputted and the priority/non-priority signal indicates non-priority, for outputting a packet selected by the output side-addressed queue manager.

Namely, the relaying apparatus of the present invention has the same basic arrangement as that of the prior art relaying apparatus shown in FIG. 10. The input side queues included in the input side accommodating portions 10_1–10_N and the output side queues included in the output side accommodating portions 50_1–50_N are mutually connected by the switch fabric 40 in a mesh form.

Each of the input side accommodating portions 10 includes output side-addressed queue managers and an inter-output link manager provided corresponding to each of the output side accommodating portions 50, and the output side queues of the output side accommodating portions include priority queues and non-priority queues.

When selecting a bandwidth guaranteed packet or a bandwidth non-guaranteed packet, the output side-addressed queue managers select the bandwidth guaranteed packet so as to guarantee a bandwidth, and output a priority/non-priority signal indicating which of the bandwidth guaranteed packet and the bandwidth non-guaranteed packet has been selected and an output demand signal for demanding the output of the selected packet.

When (1) the output demand signal is outputted and (2) the priority/non-priority signal indicates priority in a time slot of a fixed period, (3) the inter-output link manager selects any of the output side-addressed queue managers in which a corresponding output side accommodating portion as a destination has an empty area in the priority queue. Alternatively, when (1) the output demand signal is outputted and (2) the priority/non-priority signal indicates non-priority, (3) the inter-output link manager selects any of the output side-addressed queue managers in which a corresponding output side accommodating portion as a destination has an empty area in the non-priority queue.

The inter-output link manager outputs the packet which the selected output side-addressed queue manager(s) has (have) selected and demanded the output. As a result, the bandwidth guaranteed packet preferentially selected at the output side-addressed queue manager is transmitted within the fixed period.

So long as there is such a transmittable packet, the packet is transmitted thereby enabling the bandwidth (time slot) of the physical link 62 (see FIG. 10) connecting the input side accommodating portion 10 and the switch fabric 40 to be efficiently utilized and the reservation bandwidth of e.g. the connectionless bandwidth guaranteed packet to be guaranteed.

It is to be noted that the algorithm of the output side queue is not questioned in the present invention. Also, it is possible that the number of the input side accommodating portions is assumed to be either one or more.

Also, in the present invention according to claim 2, the time slot may be preliminarily allocated to each output side-addressed queue manager, and the inter-output link manager may select the output side-addressed queue manager in a predetermined allocation order when the output demand signal is outputted in each time slot and the priority/non-priority queue corresponding to the priority/non-priority signal has the empty area, and may dynamically select either of the output side-addressed queue managers in a time slot in which no output demand signal is outputted or both of the priority and non-priority queues are full.

Namely, as shown in the operation principle (1) of the present invention in FIG. 1, time slots TS1–TSN are preliminarily allocated to each of the output side-addressed queue managers. This means that the time slots TS1–TSN are preliminarily allocated to each of the output side accommodating portions, since each output side-addressed queue manager is provided for each output side accommodating portion.

The inter-output link manager selects the output side-addressed queue manager allocated to the time slot TS1, or selects the output side-addressed queue manager corresponding to e.g. the output side accommodating portion 50_1, when (1) the output demand signal of the output side-addressed queue manager is outputted, and (2) the priority/non-priority signal indicates "priority" and the priority queue has an empty area, or the priority/non-priority signal indicates "non-priority" and the non-priority queue has an empty area, that is, when there is a transmittable packet at the allocated output side-addressed queue manager.

Similarly, the inter-output link manager selects the output side-addressed queue manager corresponding to the output side accommodating portion 50_2 in the next time slot TS2.

The inter-output link manager dynamically selects another packet transferable output side-addressed queue manager corresponding to e.g. the output side accommodating portion 50_2 in the time slot TS3, when (1) the output demand signal is not outputted from the output side-addressed queue manager allocated to the time slot TS3, or (2) both of the priority and non-priority queues are full, that is, when there is no transferable packet at the allocated output side-addressed queue manager.

Also, in the present invention according to claim 3, in empty time slots generated within the fixed period, the inter-output link manager may select any of the output side-addressed queue managers in which a corresponding output side accommodating portion as a destination has an empty area in its non-priority queue from among all of the output side-addressed queue managers which output the output demand signals and in which priority/non-priority signals indicate the non-priority.

In case an empty area is generated in the time slots TS(I+1)–TSN (see FIG. 1) as a result of the above-mentioned selection within the fixed period, during the empty time slots TS(I+1)–TSN, the output side-addressed queue manager is selected in which a corresponding output side accommodating portion has an empty area in its non-priority queue from among all of the output side-addressed queue managers (1) which output the output demand signal and (2) in which priority/non-priority signals indicate the non-priority. Namely, the transmittable bandwidth non-guaranteed packet is selected.

Thus, it becomes possible to efficiently utilize the empty time slot generated for the fixed period.

Also, in the present invention according to claim 4, in each time slot the inter-output link manager may preferentially select any of the output side-addressed queue managers in which a corresponding output side accommodating portion as a destination has an empty area in its priority queue from among the output side-addressed queue managers which output the output demand signals and in which priority/non-priority signals indicate the priority.

FIG. 2 shows an operation principle (2) of the present invention. The operation principle (2) is different from the operation principle (1) of the present invention as to the operation of the inter-output link manager.

Firstly, the inter-output link manager preferentially selects any of the output side-addressed queue managers, in the time slot TS1, in which the output side accommodating portion as a destination has an empty area in its priority queue, corresponding to e.g. the output side accommodating portion 50_1, from among the queue managers (1) which output the output demand signals and (2) in which priority/non-priority signals indicate the priority (=1).

Similarly, the inter-output link manager preferentially selects any of the output side-addressed queue managers respectively corresponding to the output side accommodating portions 50_1, 50_2, 50_N, 50_1, 50_4 and 50_2 in the time slots TS2, TS3, TS6, TS9, TS10, and TSN.

When there is no output side-addressed queue manager which meets the above-mentioned condition in the time slot TS4, the inter-output link manager selects any of the output side-addressed queue managers in which the output side accommodation portion as a destination has an empty area in its non-priority queue, corresponding to e.g. the output side accommodating portion 50_1 from among the queue managers (1) which output the demand signals and (2) in which priority/non-priority signals indicate the non-priority (=0).

Similarly, the inter-output link manager selects any of the output side-addressed queue managers corresponding to the output side accommodating portions 50_2 and 50_4 in the time slots TS7 and TS8.

It is to be noted that there is no queue manager to be selected in the time slot TS5, since there is no packet to be transmitted in all of the output side-addressed queue managers or both of the priority and non-priority queues of the output side accommodating portion which is the packet transmitting destination are full.

Also, in the present invention according to claim 5, the inter-output link manager may select a same output side-addressed queue manager a plurality of times within the fixed period.

Namely, in FIG. 2, the inter-output link manager can select the bandwidth guaranteed packet from the same output side-addressed queue manager in the time slots TS1 and TS3. If the same output side-addressed queue manager is selected a plurality of times within the fixed period (bandwidth "R") and the bandwidth of the fixed period is assumed to be "R", the bandwidth guarantee of "R" at the maximum can be performed.

Also, in the present invention according to claim 6, the input side accommodating portion may assign an identifier indicating the priority or non-priority respectively to the bandwidth guaranteed packet or bandwidth non-guaranteed packet. The output side accommodating portion may recognize the received packet as either of the bandwidth guaranteed packet or bandwidth non-guaranteed packet based on the identifier.

Thus, the output side accommodating portion easily stores the recognized bandwidth guaranteed packet and bandwidth non-guaranteed packet in the corresponding priority or non-priority queue.

Also, in the present invention according to claim 7, the input side accommodating portions and the output side accommodating portions further may manage the bandwidth guaranteed packet divided into a plurality of queues with a priority order.

Thus, it becomes possible to guarantee the bandwidth of the bandwidth guaranteed packet more precisely classified.

Also, in the present invention according to claim 8, the input side accommodating portions and the output side accommodating portions may manage the bandwidth non-guaranteed packet divided into a plurality of queues.

Also, in the present invention according to claim 9, the output side-addressed queue manager may insert one or more arbitrary length packets into the time slot. Namely, the output side-addressed queue managers may insert one or more arbitrary length packets shorter than the transmittable data length into a single time slot.

Also, in the present invention according to claim 10, the time slot may be divided into a plurality of sub-time slots, which are inserted with the packets. Thus, the number of the maximum packet length inserted into the sub-time slot becomes smaller compared with the case where the time slot is not divided. Accordingly, when burst data are transmitted by a plurality of packets, it becomes possible to scatter the packets to the upper (undivided) time slots.

Also, in the present invention according to claim 11, the priority and non-priority queues may simultaneously store the packets which simultaneously arrive within a same time slot from the input side accommodating portions. Thus, it becomes possible for each input side accommodating portion to transmit the packet from the portion itself regardless of whether or not the other input side accommodating portion simultaneously transmits the packet to the output side accommodating portion within the same time slot.

Furthermore, in the present invention according to claim 12, the selection may be performed by a round-robin method unrestrained by the fixed period in the empty time slots generated within the fixed period. Thus, it becomes possible to evenly allocate the empty time slots to the output side-addressed queue managers.

BRIEF DESCRIPTION OF THE DRAWINGS

Throughout the figures, like reference numerals indicate like or corresponding components.

DESCRIPTION OF THE EMBODIMENTS

Figure 10:
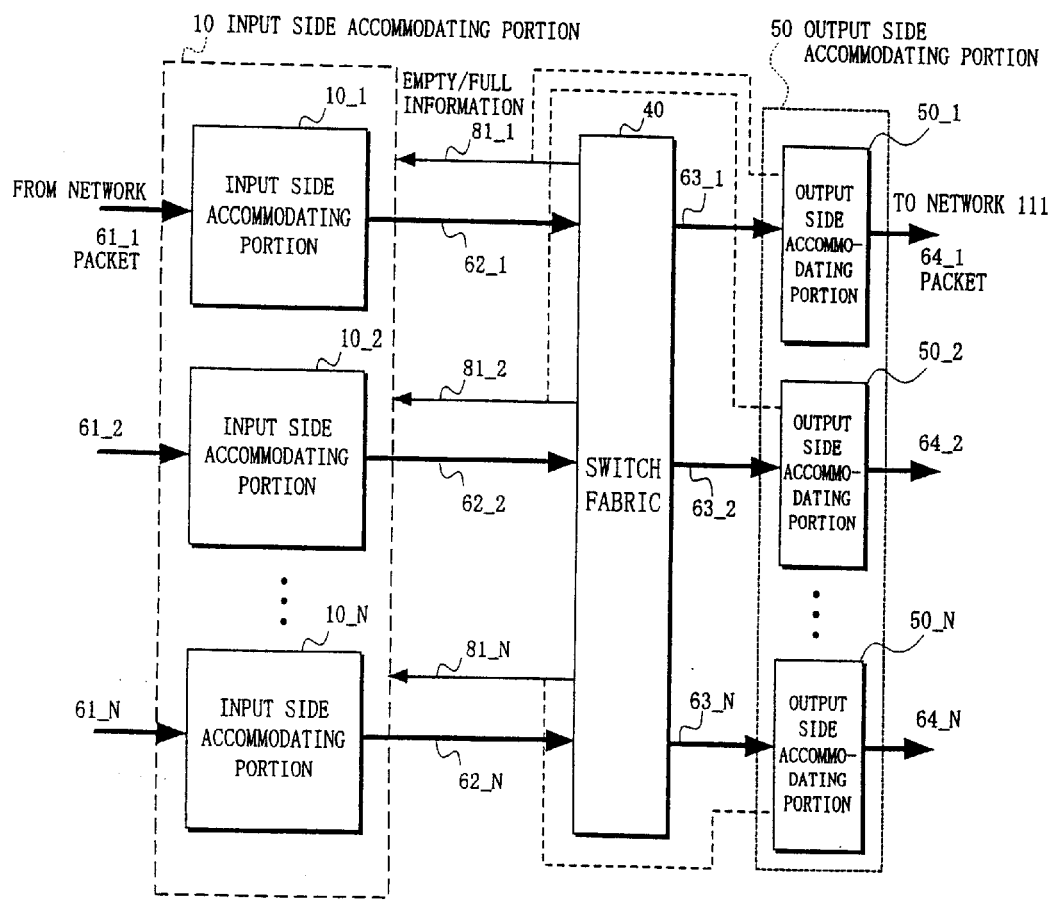
FIG. 10 is a block diagram showing an arrangement of a general relaying apparatus.
Figure 11:
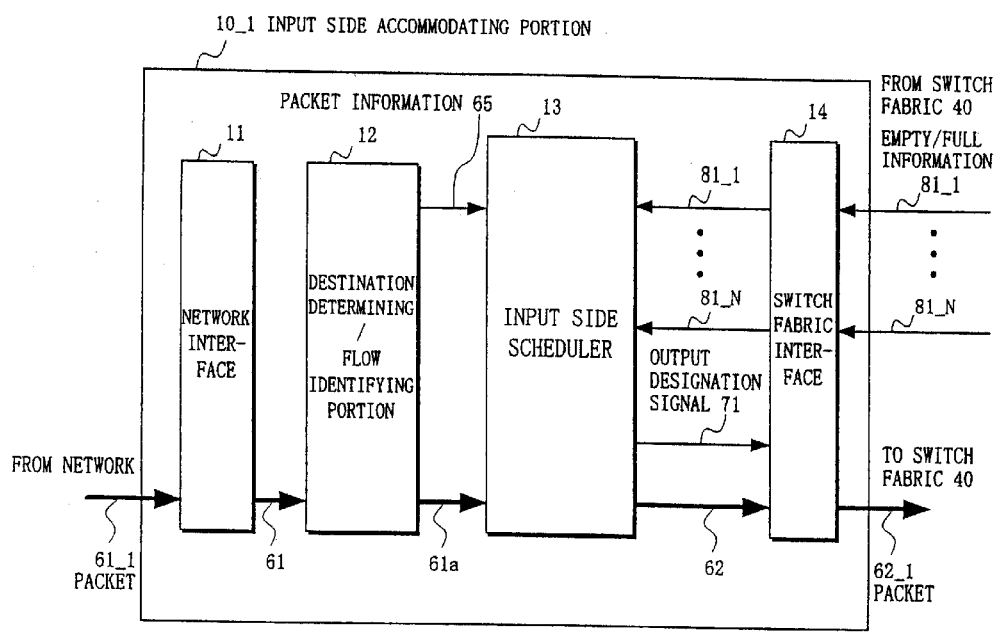
FIG. 11 is a block diagram showing an arrangement of an input side accommodating portion of a general relaying apparatus.
Figure 12A:
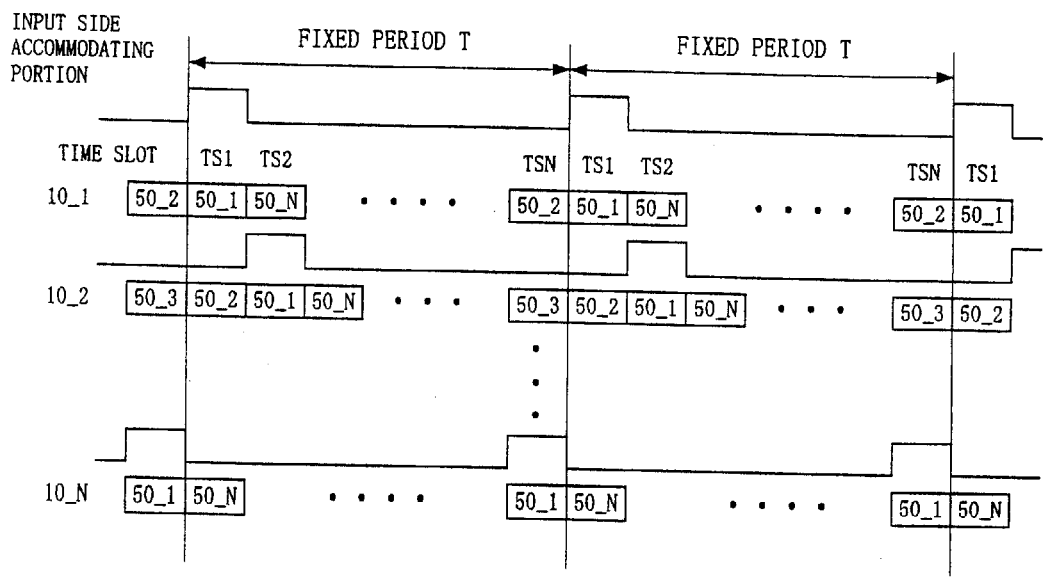
FIGS. 12A and 12B are timing charts showing prior art packet transfer timings.
Figure 12B:
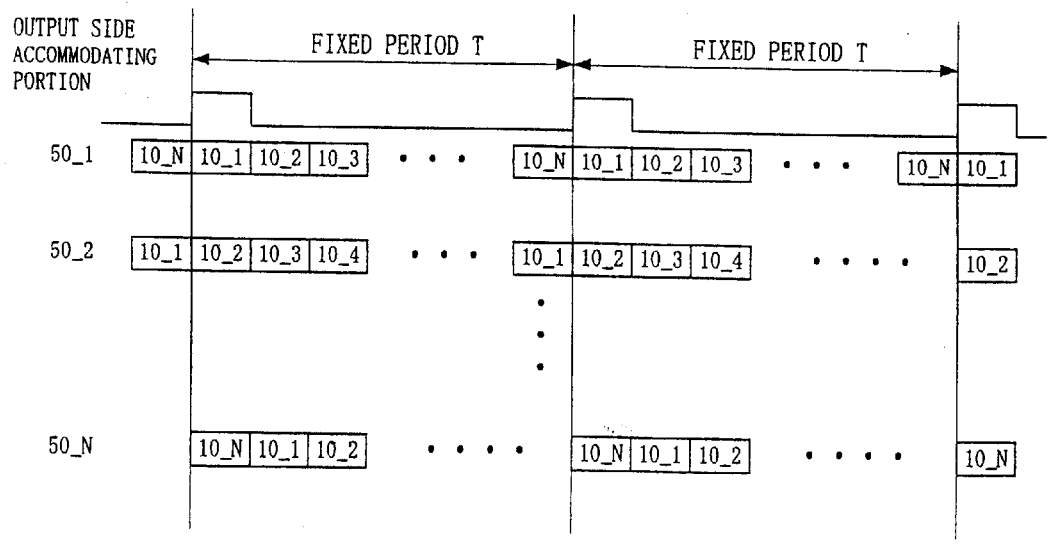

The basic arrangement of the relaying apparatus according to the present invention is the same as that of the general relaying apparatus shown in FIG. 10, whereas the operation of the input side scheduler 13 (see FIGS. 3 and 11) included in the input side accommodating portions 10_1–10_N is different from that of the prior art input side scheduler 13. Priority queues and non-priority queue are arranged, as will be described later, in the output side accommodating portions 50_1–50_N.

It is to be noted that the numbers of the input side accommodating portions 10 and the output side accommodating portions 50 are assumed to be the same "N" in FIG. 10, while those numbers may be different from each other.

Although the output side queue can also be arranged at the switch fabric 40, it is assumed to be arranged at the input side of the output side accommodating portion 50 and to be included in the output side accommodating portion 50. Also, the queue selection algorithm of the output side queue may comprise any prior art method.

Figure 1:
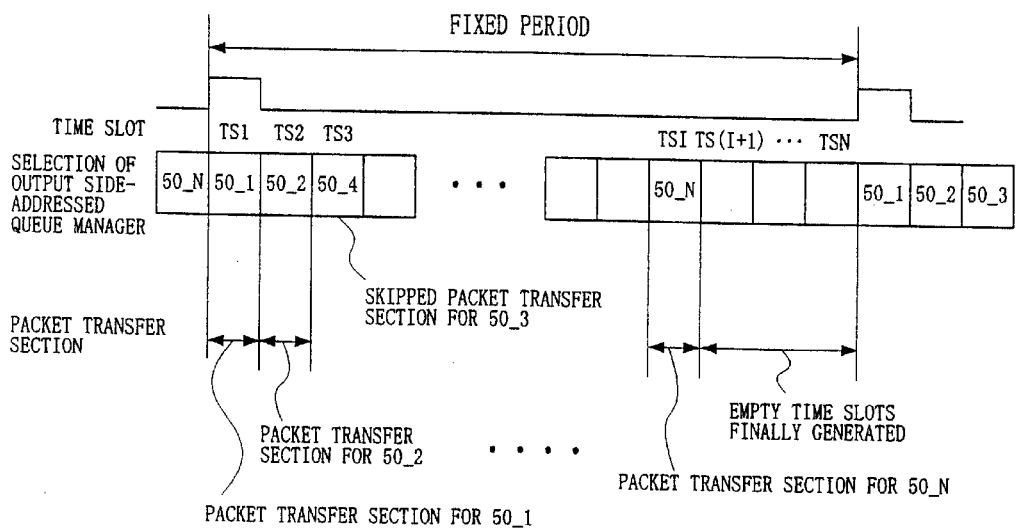
FIG. 1 is a timing chart showing a principle (1) of a packet transfer in a relaying apparatus according to the present invention.
Figure 2:
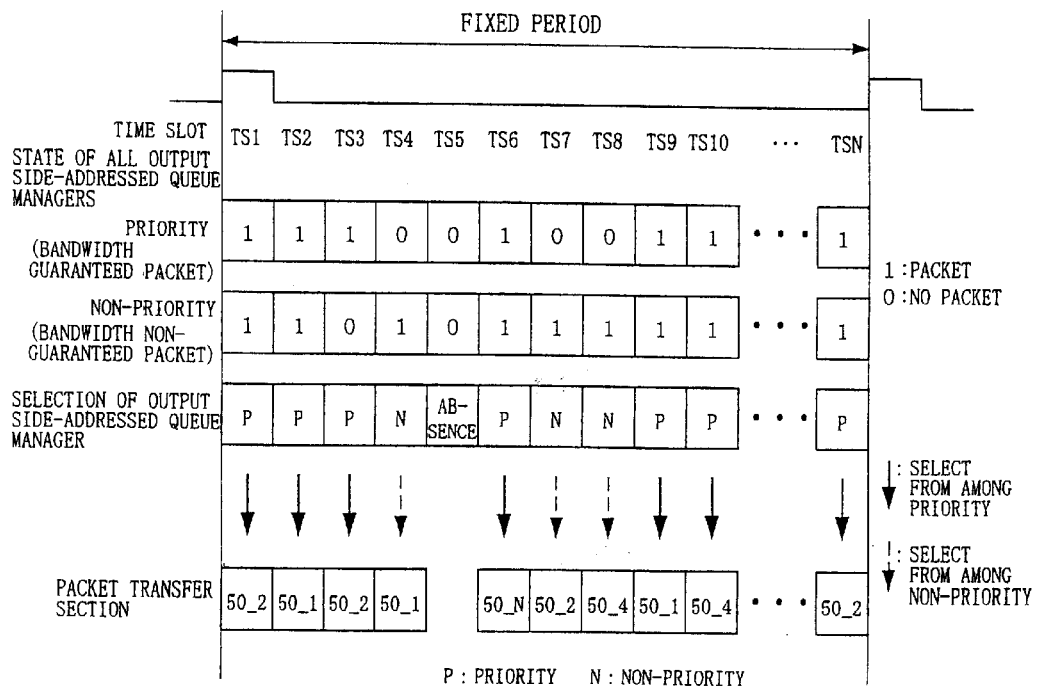
FIG. 2 is a timing chart showing a principle (2) of a packet transfer in a relaying apparatus according to the present invention.
Figure 3:
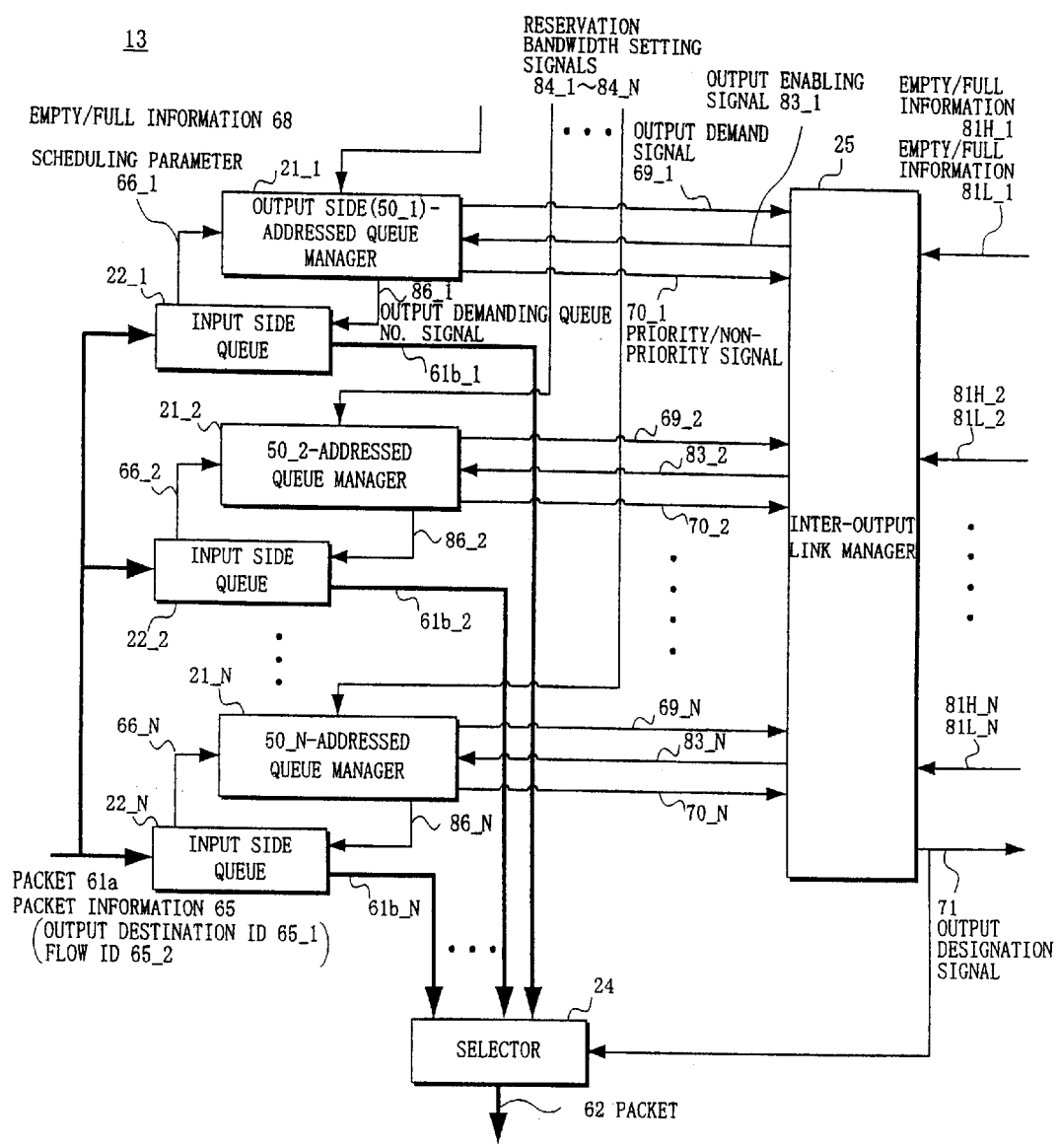
FIG. 3 is a block diagram showing an embodiment of an input side scheduler in an input side accommodating portion of a relaying apparatus according to the present invention.
Figure 13:
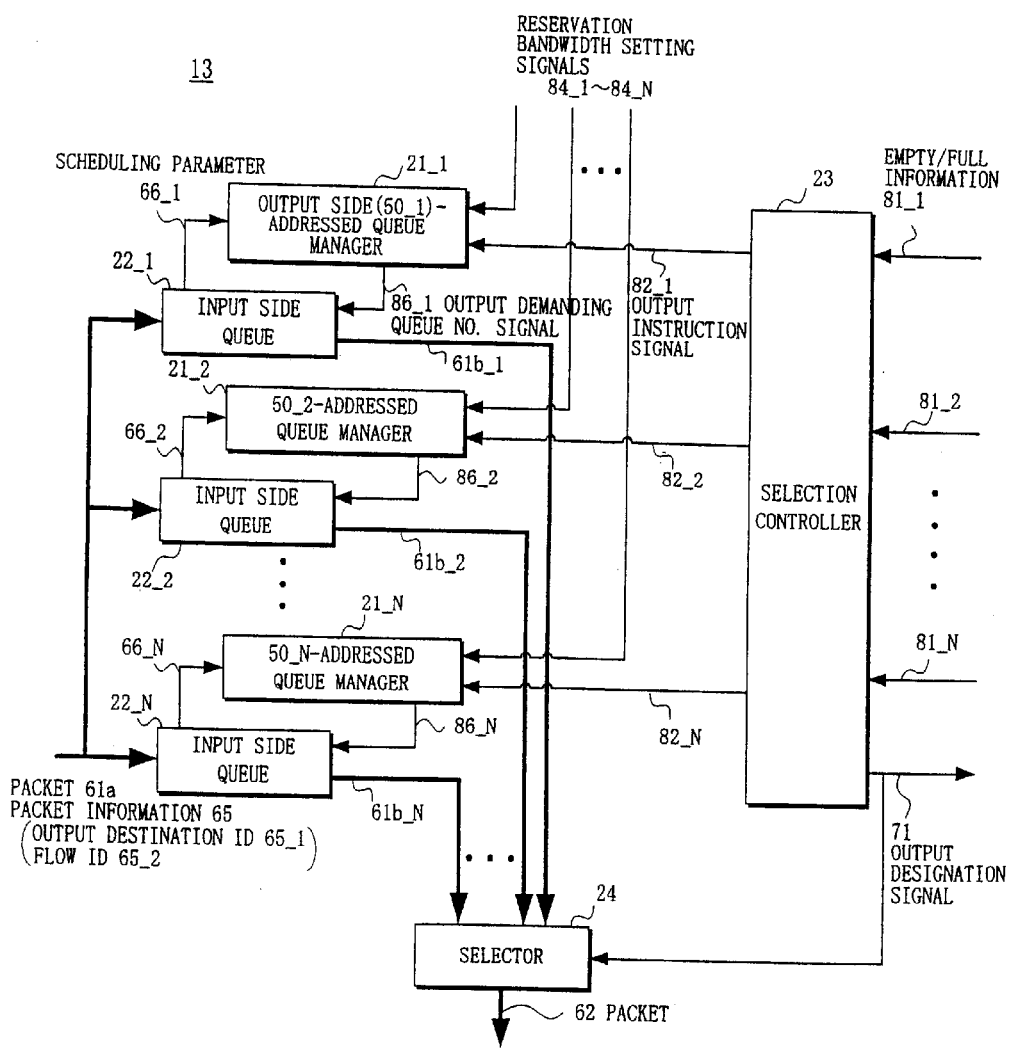
FIG. 13 is a block diagram showing an arrangement of a prior art input side scheduler.

FIG. 3 shows an embodiment of the input side accommodating portion scheduler 13 according to the present invention. The scheduler 13 is different from that of the prior art scheduler 13 shown in FIG. 13 in that an inter-output link manager 25 for performing the management between the output links is substituted for the selection controller 23, input side queues 22 have queues for queuing bandwidth guaranteed packets and bandwidth non-guaranteed packets respectively, and further output side-addressed queue managers 21 perform the management of queuing the bandwidth guaranteed packets and bandwidth non-guaranteed packets at the input side queues 22.

Also, output demand signals 69_1–69_N and priority/non-priority signals 70_1–70_N are respectively provided to the manager 25 from the queue managers 21. Output enabling signals 83_1–83_N (hereinafter, sometimes generally represented by reference numeral 83), instead of the output instruction signals 82_1–82_N, are respectively provided to the output side-addressed queue managers 21 from the manager 25. Empty/full information 81H_1–81H_N and 81L_1–81L_N indicating whether or not the priority queues and the non-priority queues of the output side accommodating portion 50 are respectively in an empty state or a full state is inputted to the manager 25.

Hereinafter, the arrangements and operations of the input side queue 22, the queue manager 21, and the manager 25 will now be described.

Input Side Queue 22

Figure 14:
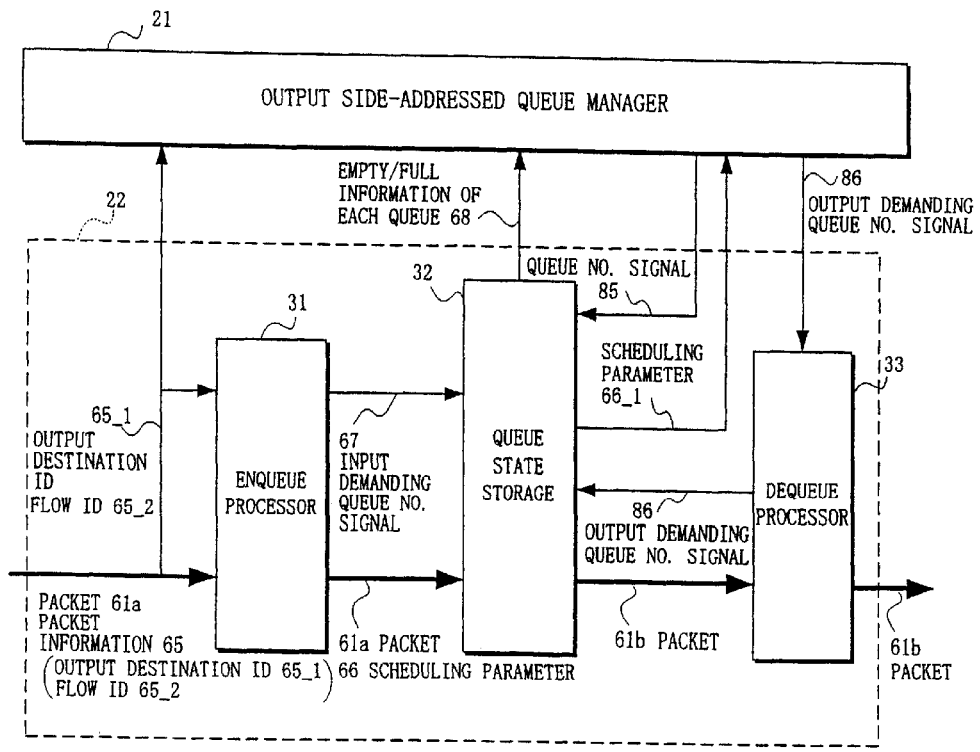
FIG. 14 is a block diagram showing an arrangement of an input side queue in a general relaying apparatus.
Figure 15:
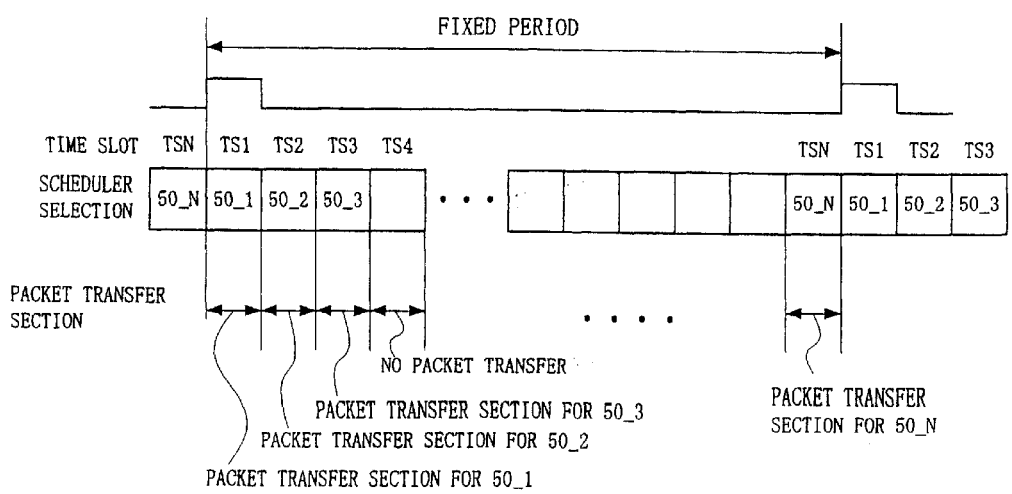
FIG. 15 is a timing chart showing a prior art packet transfer operation.
Figure 16:
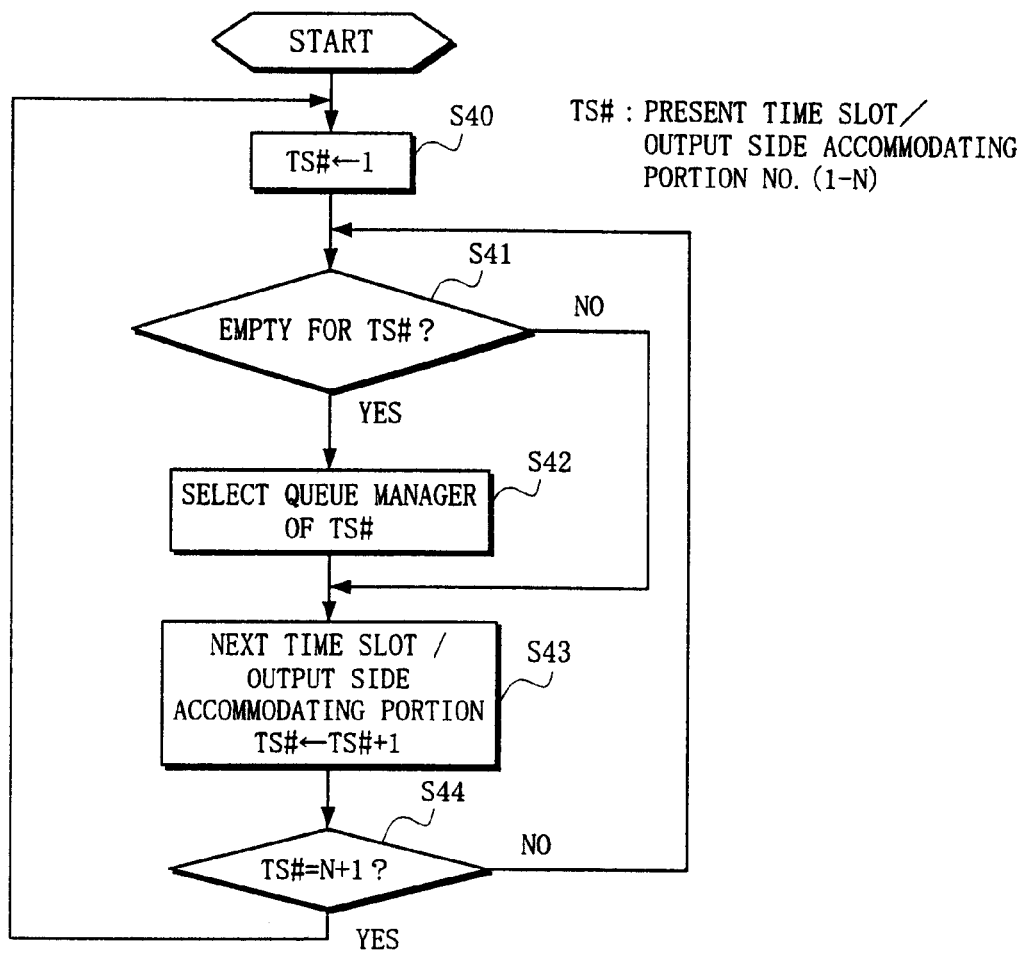
FIG. 16 is a flow chart showing a procedure of a prior art packet transfer operation.

The basic arrangement of the input side queue 22 is the same as that of the prior art input side queue 22 shown in FIG. 14, which is composed of the enqueue processor 31, the queue state storage 32, and the dequeue processor 33.

In operation, if a given identifier (hereinafter, occasionally abbreviated as ID) indicating an output destination is addressed to its own processor, the enqueue processor 31 generates the queue No. according to the flow identifier, inputs the packet to the queue state storage 32, and generates a parameter such as a packet arrival time required for a scheduler to be inputted to the queue state storage 32.

The queue state storage 32 maintains the logical FIFO structure of the queues in order to compose a plurality of transfer waiting queues, and stores the packet 61a and the scheduling parameter 66, such as packet length, packet arrival time required for scheduler, according to an input demanding queue No. signal 67 from the enqueue processor 31.

In addition, the queue state storage 32 adds the queue Nos. to the queues based on a queue No. signal 85 from the output side-addressed queue manager 21, and provides the scheduling parameter 66 and the empty/full information 68 of the queues to the queue manager 21.

The dequeue processor provides an output demanding queue No. signal 86 from the output side-addressed queue manager 21 to the queue state storage 32, receives the packet 61b of the queue No. designated by the signal 86, and assigns the identifier of the priority/non-priority indicating the bandwidth guaranteed packet or bandwidth non-guaranteed packet to the packet 61b to be outputted.

An output side queue 42 which has received the packet 61b can recognize that the packet 61b is either the priority packet or non-priority packet based on the identifier. It is to be noted that whether the packet is "priority" or "non-priority" may be notified to the output side queue 42 by an out-of-band signaling without assigning the identifier of the priority/non-priority.

Output Side-addressed Queue Manager 21

Figure 4:
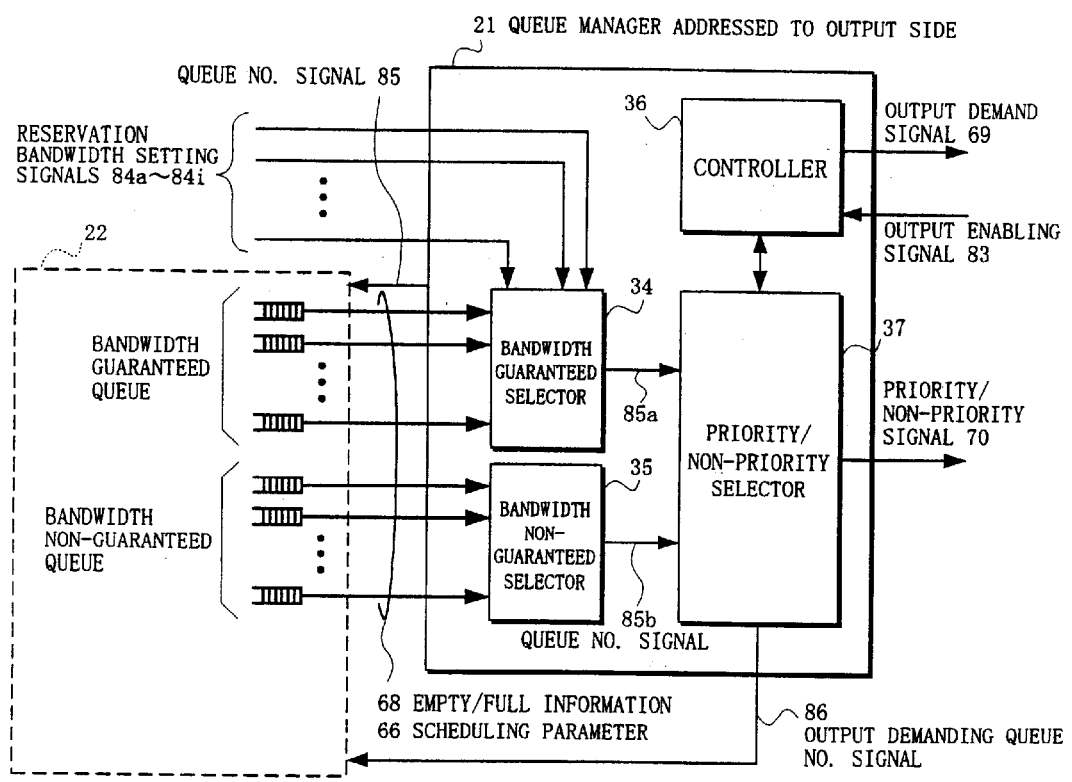
FIG. 4 is a block diagram showing an embodiment of an output side-addressed queue manager of an input side scheduler in a relaying apparatus according to the present invention.

FIG. 4 shows an arrangement of the output side-addressed queue manager 21, which is composed of a bandwidth guaranteed selector 34, a bandwidth non-guaranteed selector 35, a controller 36, and a priority/non-priority selector 37.

In operation, the bandwidth guaranteed selector 34 preferentially processes one or more queues in which the bandwidths should be guaranteed from among the transfer waiting queues composed of a plurality of queues, and carries out the scheduling function of performing the selection so as to guarantee the given reservation bandwidth. The setting of the reservation bandwidth is performed by reservation bandwidth setting signals 84a–84i. The scheduling algorithm performed in this operation is not questioned.

The bandwidth non-guaranteed selector 35 carries out a scheduling function of processing one or more queues not requiring the bandwidth guarantee. The scheduling algorithm performed in this operation is not questioned.

Only when there is no queue to be outputted among all the queues in which the bandwidth should be guaranteed, the priority/non-priority selector 37 performs the selection process to one or more queues in which the bandwidths is not guaranteed. The selection algorithm performed in this operation is not questioned.

Also, if there is a queue to be outputted, the priority/non-priority selector 37 notifies the output demanding queue No. signal 86 for demanding an output to the inter-output link manager 25 (see FIG. 3) through the controller 36, and directly notifies the priority/non-priority signal 70 indicating that the selected queue (packet) is either priority (bandwidth guaranteed) or non-priority (bandwidth non-guaranteed), to the same.

When obtaining the output enabling signal 83 from the inter-output link manager 25 through the controller 36, the priority/non-priority selector 37 provides the output demanding queue No. signal 86 including the queue No. to the input side queue 22.

Inter-output Link Manager 25

The inter-output link manager 25 (see FIG. 3) has the following function in order to perform a scheduling management among the output side-addressed queue managers 21:

The function in which a plurality of output demand signals 69_1–69_N and priority/non-priority signals 70_1–70_N from the output side-addressed queue managers 21 are received, and whether the packet demanded to be outputted based on the signals 69 and 70 is "priority" or "non-priority" is recognized to select a single packet according to the empty/full information 81H_1–81H_N and 81L_1–81L_N respectively from a priority queue 43 and a non-priority queue 44 (see FIG. 5) of each output side accommodating portion 50, and to output the output enabling signals 83_1–83_N.

Figure 5:
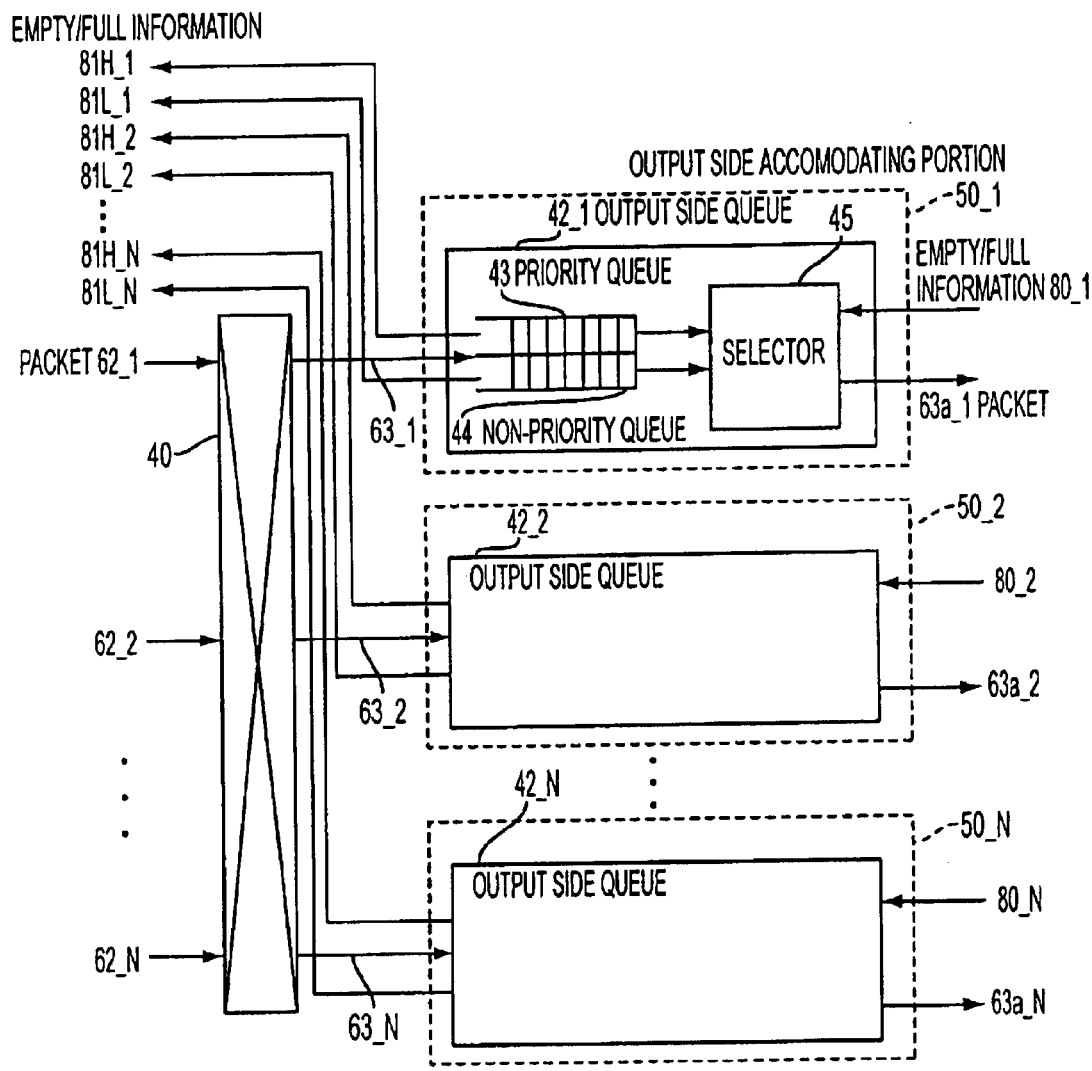
FIG. 5 is a block diagram showing an embodiment of an output side queue in an output side accommodating portion of a relaying apparatus according to the present invention.

FIG. 5 shows an arrangement of the output side queues 42_1–42_N (hereinafter, sometimes generally represented by reference numeral 42) corresponding to the output side accommodating portions 50_1–50_N connected to the switch fabric 40 (see FIG. 10). The output side queue 42 is composed of the priority queue 43, the non-priority queue 44, and a selector 45.

The output side queue 42_1, for example, receives a plurality of packets 63 sent from the input side accommodating portions 10_1–10_N through the switch fabric 40 within the same time slot, and allocates the packets based on the priority/non-priority ID included in the received packets 63 to be stored in the priority queue 43 and the non-priority queue 44. It is to be noted that the allocation may be performed by the out-of-band signaling, as mentioned above.

The selector 45 outputs a packet 64_1 from either the priority queue 43 or the non-priority queue 44 according to a predetermined algorithm. Namely, when there is a packet in the priority queue, it is outputted without fail. Only when there is no packet in the priority queue, the packet in the non-priority queue is outputted. When there is a queue at the latter stage of the output side queue 42_1 (not shown), a packet 63a_1 is outputted according to the algorithm including the empty/full information 80_1.

Furthermore, the output side queues 42_1–42_N provide the empty/full information 81H_1, 81L_1, - - -, 81H_N, and 81L_N indicating whether or not the priority queue 43 or the non-priority queue 44 is empty, to the input side accommodating portions 10_1–10_N.

Figure 6:
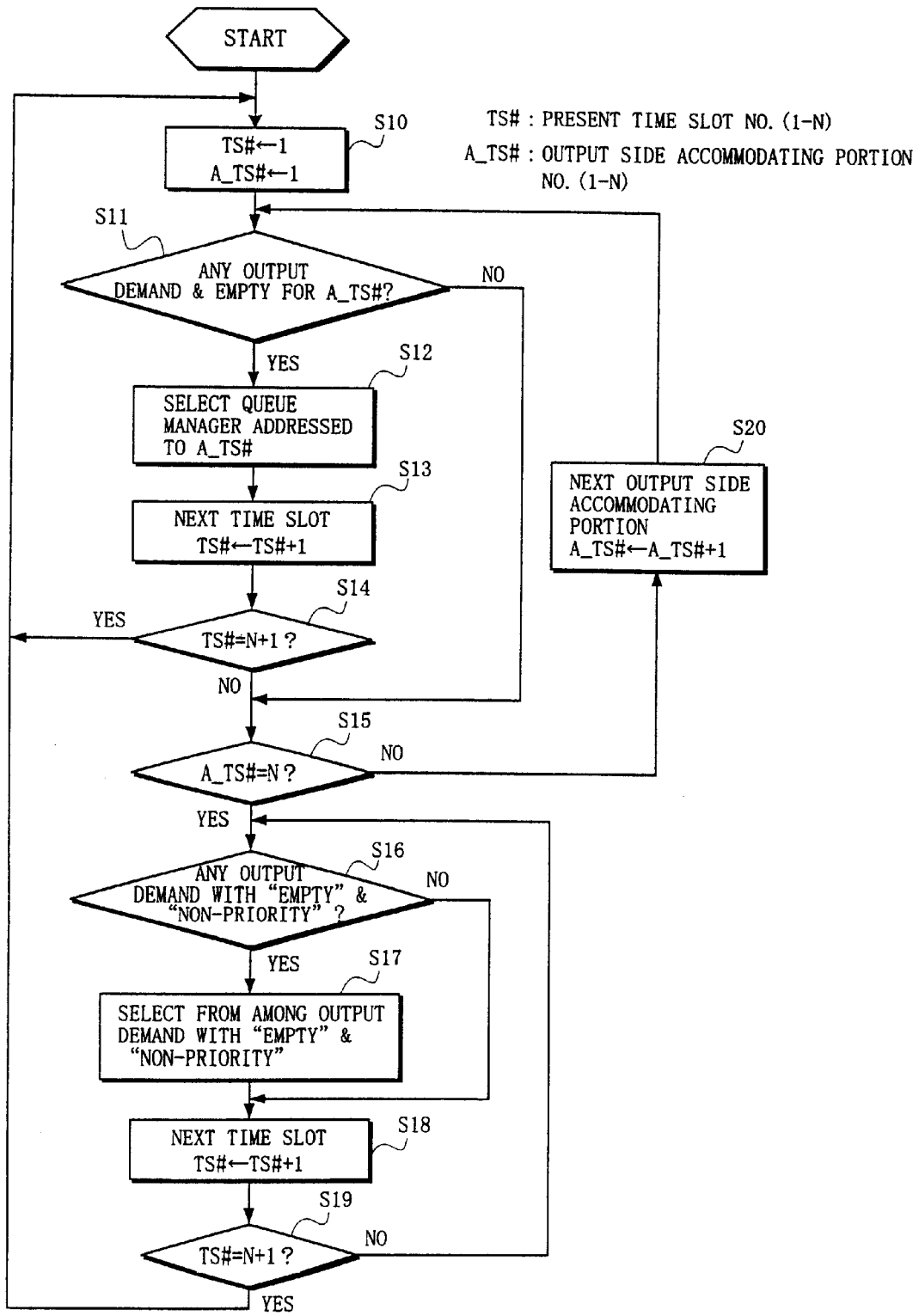
FIG. 6 is a flow chart showing a process procedure example (1) of an inter-output link manager in a relaying apparatus according to the present invention.
Figure 7:
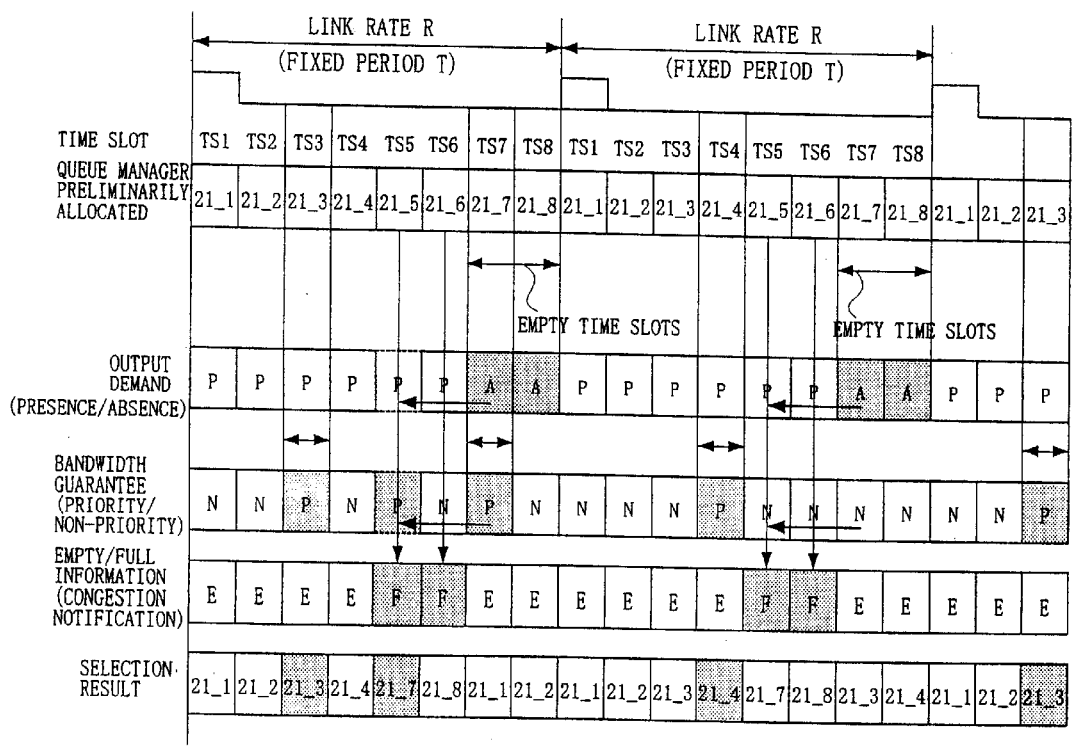
FIG. 7 is a timing chart showing a packet transfer example (1) by an inter-output link manager in a relaying apparatus according to the present invention.

FIG. 6 shows an example (1) of a process flow at the inter-output link manager 25 shown in FIG. 3, and FIG. 7 shows an example of a transfer timing of the packet 62 at that time. Hereinafter, the operation of the inter-output link manager 25 will be described referring to FIGS. 3 and 7.

The number "N" of the output side accommodating portions 50 (see FIG. 10) (that is, the number of output side-addressed queue managers 21 and the input side queues 22 (see FIG. 3)) is assumed to be "8", and the fixed period is divided into time slots TS1–TS8, as shown in FIG. 7.

Step S10: Both of the present time slot No. TS# and the output side accommodating portion No. A_TS# (corresponds to the output side accommodating portion 50_i of FIG. 3, i.e. "i" (i=1–8) of the output side (50_i)-addressed queue manager 21_i) are initialized to "1". Thus, the time slot is periodically initialized and will have a fixed period.

Step S11: In FIG. 3, the inter-output link manager 25 proceeds to step S12 when (1) the output demand signal 69_1 of the output side-addressed queue manager 21_1 is outputted, and (2) the empty/full information 81H_1 and 81L_1 corresponding to the priority/non-priority by the priority/non-priority signal 70 indicates "empty", and proceeds to step S15 when the above-mentioned condition is not satisfied.

Step S12: The manager 25 selects the queue manager 21_i, to which the output enabling signal 83_i is provided. The packet 61b_i selected by the input side queue 22_i is outputted from the selector 24 as the packet 62 (see FIG. 3), and transmitted to the output side queue 42_i of the output side accommodating portion 50_i through the switch fabric 40 (see FIG. 5).

Step S13: Time slot No. TS#=TS#+1 is executed, thereby proceeding to the next time slot.

Step S14: Whether or not the time slot No. TS#=8+1 is checked. When the time slot No. TS#=8+1, that is, the process in all of the time slots is finished, the process returns to step S10 and shifts to a next period process.

Step S15: Whether or not A_TS#=8 is checked. When A_TS# is not 8, the process proceeds to step S20.

Step S20: A_TS#=A_TS#+1 is executed. Namely, the process proceeds to the next queue manager 21_2 and returns to step S11, so that steps S11–S15 and S20 are repeated until TS#=8+1 (at step S14) or A_TS#=8 (at step S15).

Thus, the manager 25 selects the output side (50_1)-addressed queue manager 21_1 in the time slot TS1, since (1) the output demand signal 69_1 is outputted, (2) the priority/non-priority signal 70_1 indicates non-priority, and (3) the corresponding empty/full information 81L_1 indicates "empty".

Similarly, the manager 25 selects the output side (50_2)-addressed queue manager 21_2 in the time slot TS2.

Furthermore, the manager 25 selects the output side (50_3)-addressed queue manager 21_3 in the time slot TS3, since (1) the output demand signal 69_3 is outputted, (2) the priority/non-priority signal 70_3 indicates priority (preferentially outputted in time slot TS3 in FIG. 7), and (3) the corresponding empty/full information 81H_3 indicates "empty".

The queue manager 21_4 is selected in the time slot TS4 in the same way as in the time slots TS1 and TS2.

Since the empty/full information 81H_5 and 81L_5 corresponding to the queue manager 21_5 indicates "full" at step S11 of the time slot TS5, the queue manager 21_5 is not selected, so that the process proceeds to the queue manager 21_6 (at step S20). Similarly at the next step S11, the process proceeds to the queue manager 21_7 at step S20.

At the next step S11, the manager 25 selects the queue manger 21_7 in the time slot TS5, since (1) the output demand signal 69_7 of the output side (50_7)-addressed queue manager 21_7 is outputted, (2) the priority/non-priority signal indicates priority, and (3) the corresponding empty/full information 81H_7 indicates "empty". Similarly, the manager 25 selects the output side (50_8)-addressed queue manager 21_8 in the time slot TS6.

As a result, the time slots TS7 and TS8 assume the empty time slots "without" (null) the output demand (indicated by "A" for the absence of output demand in FIG. 7), so that the process proceeds to step S16 through steps S14 and S15.

Step S16: The queue manager 21 (1) which outputs the output demand signal, (2) in which the priority/non-priority signal indicates non-priority, and (3) in which the corresponding empty/full information 81L indicates "empty" is searched. When there is such a queue manager, the process proceeds to step S17, and otherwise proceeds to step S18.

Step S17: The queue manager 21_1, for example, in which the signal indicating "non-priority" is outputted and in which the corresponding empty/full information indicates "empty" is selected (see time slot TS7 in FIG. 7).

Step S18: The process shifts to the next time slot.

Step S19: When the process for the fixed period is not completed, the process proceeds to step S16.

Thereafter, steps S16–S19 are repeated until the process for the fixed period is completed.

As a result, the manager 25 selects the queue managers 21_1 and 21_2, for example, respectively in the time slots TS7 and TS8 (see time slots TS7 and TS8 in FIG. 7).

It is to be noted that the algorithm by which the manager 25 selects a single queue manager 21 from among a plurality of output side-addressed queue managers 21 which meet the condition is not questioned. In the empty time slot generated for the fixed period, for example, it is also possible to perform the selection by a round-robin method unrestrained by the fixed period.

Namely, as shown in FIG. 7, the manager 25 selects the queue managers 21_1 and 21_2 which meet the condition respectively in the time slots TS7 and TS8 for the first fixed period, and selects the queue managers 21_3 and 21_4 respectively in the time slots TS7 and TS8 for the next fixed period.

In the above-mentioned description of the packet transfer timing, the case where the manager 25 transmits a single fixed length packet in a single time slot has been described. However, it is possible to insert not only a single fixed length packet but also one or more arbitrary length packets into the time slot.

This will be described referring to FIGS. 8A and 8B.

Figure 8A:
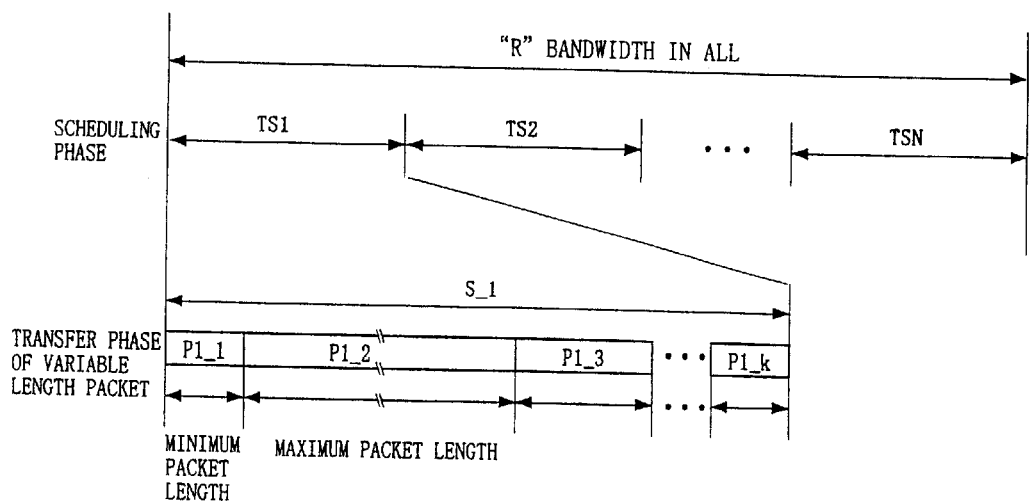
FIGS. 8A and 8B are timing charts showing an example of an arbitrary length packet transfer by an inter-output link manager in a relaying apparatus according to the present invention.

FIG. 8A shows a case where the entire bandwidth "R" (fixed period) is divided into time slots TS1–TSN of an equal bandwidth. In the time slot TS1, for example, packets P1_1–P1_k whose total packet length is smaller than the data length which can be transmitted in a time slot S_1 can be transferred.

Figure 8B:
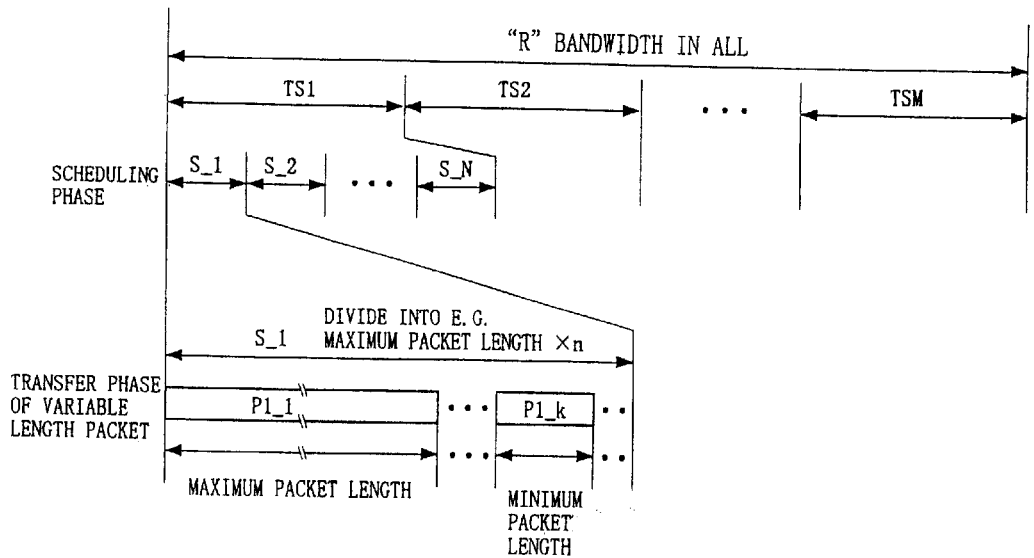

FIG. 8B shows a case where the entire bandwidth "R" is divided into the time slots TS1–TSM of the equal bandwidth, and the time slots TS1–TSM are further divided into time slots S__1–S__N (hereinafter, sometimes generally represented by reference character "S") of an equal bandwidth. At this time, for example, the bandwidth of the time slot "S" is divided so as to assume "the maximum packet length×n".

If "n" is assumed to be "1", for example, only a single maximum length packet can enter in each time slot "S". Furthermore, in case the output side-addressed queue managers 21__1–21__N are allocated in each of the time slots S__1–S__N, the burst data divided into the maximum length packets managed by, for example, the queue manager 21__1 are scattered into the time slots TS1–TSN to be transmitted.

Figure 9:
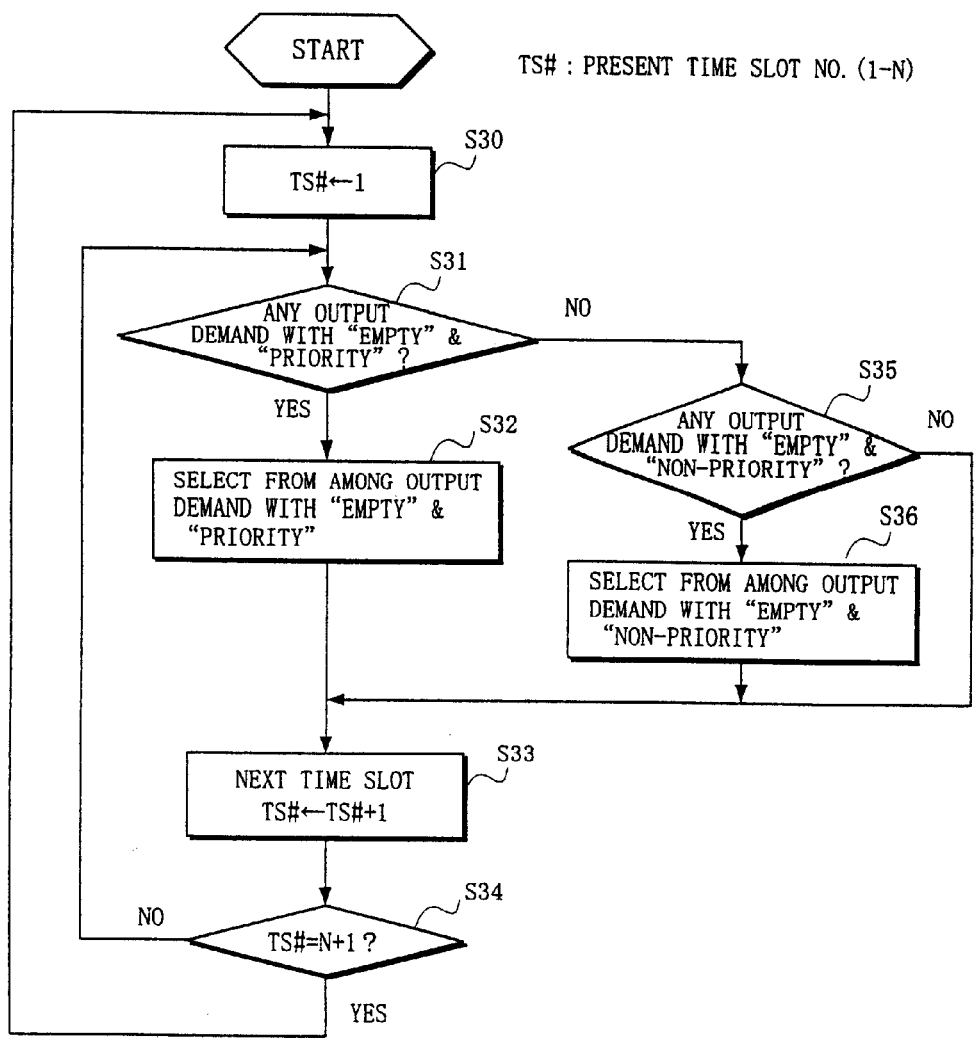
FIG. 9 is a timing chart showing a packet transfer example (2) by an inter-output link manager in a relaying apparatus according to the present invention.

FIG. 9 shows an example (2) of a process flow of the inter-output link manager 25 shown in FIG. 3, which will be described hereinafter.

Step S30: The present time slot No. TS# is initialized to "1". Thus, the time slot is periodically initialized and will have a fixed period.

Step S31: The manager 25 retrieves whether or not there is a queue manager (1) which outputs the output demand signal 69, (2) in which the priority/non-priority signal 70 indicates priority, and (3) in which the corresponding empty/full information 81H indicates "empty" in all of the queue managers 21. Namely, when there is-such a transmittable bandwidth guaranteed packet, the process proceeds to step S32, and otherwise proceeds to step S35.

Step S32: The manager 25 selects one of the queue managers 21 having the transmittable bandwidth guaranteed packets as a queue manager 21 to which the present time slot is allocated, and the process proceeds to step S33. The algorithm of the selection is not questioned.

Step S33: TS#←TS#+1 is executed, and the process shifts to the next time slot.

Step S34: When TS# is not N+1, the process returns to step S31, at which the retrieval of the queue manager 21 selected at the next time slot is performed.

Step S35: When there is no transmittable bandwidth guaranteed (priority) packet at step S31, the manager 25 retrieves whether or not there is a queue manager which outputs the output demand signal 69 in which the priority/non-priority signal 70 indicates non-priority, and in which the corresponding empty/full information 81L indicates "empty" in all of the queue managers 21. When there is such a queue manager, that is, there is a transmittable bandwidth non-guaranteed (non-priority) packet, the process proceeds to step S36, and otherwise proceeds to step S33.

Step S36: The manager 25 selects one of the queue managers 21 having the transmittable bandwidth non-guaranteed packets as a queue manager 21 to which the present time slot is allocated, and the process proceeds to step S33. The algorithm of the selection is not questioned.

Thus, the manager 25 selects the transmittable bandwidth guaranteed packet at the process of steps S31, S32, S33, and S34, selects the transmittable bandwidth non-guaranteed packet at the process of steps S31, S35, S36, S33, and S34, and performs a selection operation when there is neither transmittable bandwidth guaranteed packet nor non-guaranteed packet at the process of steps S31, S35, S33, and S34.

It is to be noted that if the algorithm by which the packet can be selected from the same queue manager 21 upon the selection of the transmittable bandwidth guaranteed packet at the process of steps S31, S32, S33 and S34 for the same period is adopted, the maximum "N" bandwidth guaranteed packets can be transmitted from the same queue manager 21 to the same period (bandwidth "R"). Namely, the bandwidth guarantee up to the maximum "R" can be performed.

Also, the present invention is not limited to this embodiment. By performing the scheduling at the input side accommodating portion with the method shown in the present invention, the scheduling at the switch fabric becomes comparatively easy between the priority and the non-priority. By adequately setting the reservation bandwidth of the input side accommodating portion, the bandwidth guarantee to be guaranteed at the relaying apparatus can be realized.

As described above, a relaying apparatus according to the present invention is arranged such that in a time slot of a fixed period an output side-addressed queue manager corresponding to each of output side accommodating portions selects a bandwidth guaranteed packet so as to guarantee a bandwidth, and outputs a priority/non-priority signal for indicating which of the bandwidth guaranteed packet and a bandwidth non-guaranteed packet has been selected, and an output demand of the packet, and an inter-output link manager selects the packet having an empty area in the priority queue or non-priority queue of the output side accommodating portion as a destination corresponding to the packet which is demanded to be outputted. Therefore, it becomes possible to efficiently utilize the bandwidth of the physical link which connects the input side accommodating portion and the switch, and to guarantee a reservation bandwidth of e.g. a connectionless bandwidth guaranteed packet.

Also, in the above-mentioned arrangement, the time slot is preliminarily allocated to each output side-addressed queue manager, and the inter-output link manager selects a transmittable packet in each time slot in an allocation order when the output side-addressed queue manager has the same, dynamically selects the transmittable packet when there is no transmittable packet, and further selects a transmittable bandwidth non-guaranteed packet in an empty time slot generated for a fixed period. Thus, the same effect can be obtained.

Also, in the above-mentioned arrangement, by preferentially selecting the transmittable bandwidth guaranteed packet in each time slot, and selecting the same output side-addressed queue manager a plurality of times within the fixed period, the reservation bandwidth addressed to the output side accommodating portion is adequately set in the input side accommodating portions of the entire apparatus. Therefore, it becomes possible to set a bandwidth guarantee value up to the maximum "R", when the bandwidth of the fixed period is assumed to be "R".

What we claim is:

1. A relaying apparatus comprising:

input side accommodating portions including input side queues, a plurality of output side accommodating portions respectively including output side queues, and a switch fabric for mutually connecting the input side queues and the output side queues in a mesh form, each of the input side accommodating portions including;

output side-addressed queue managers provided corresponding to each output side accommodating portion as a destination which select, upon a selection of a bandwidth guaranteed packet or a bandwidth non-guaranteed packet, the bandwidth guaranteed packet so as to guarantee a bandwidth, and which output a priority/non-priority signal for indicating which of the bandwidth guaranteed packet and the bandwidth non-guaranteed packet has been selected, and an output demand signal for demanding an output of the selected packet, and an inter-output link manager which, in a time slot of a fixed period, selects any of the output side-addressed queue managers in which a corresponding output side accommodating portion as a destination has an empty area in its priority queue when the output demand signal is outputted and the priority/non-priority signal indicates priority, or selects any of the output side-addressed queue managers in which a corresponding output side accommodating portion as a destination has an empty area in its non-priority queue when the output demand signal is outputted and the priority/non-priority signal indicates non-priority, for outputting a packet selected by the output side-addressed queue manager.

2. The relaying apparatus as claimed in claim 1 wherein the time slot is preliminarily allocated to each output side-addressed queue manager, and the inter-output link manager selects the output side-addressed queue manager in a pre-determined allocation order when the output demand signal is outputted in each time slot and the priority/non-priority queue corresponding to the priority/non-priority signal has the empty area, and dynamically selects either of the output side-addressed queue managers in a time slot in which no output demand signal is outputted or both of the priority and non-priority queues are full.

3. The relaying apparatus as claimed in claim 2 wherein in empty time slots generated within the fixed period, the inter-output link manager selects any of the output side-addressed queue managers in which a corresponding output side accommodating portion as a destination has an empty area in its non-priority queue from among all of the output side-addressed queue managers which output the output demand signals and in which priority/non-priority signals indicate the non-priority.

4. The relaying apparatus as claimed in claim 1 wherein in each time slot the inter-output link manager preferentially selects any of the output side-addressed queue managers in which a corresponding output side accommodating portion as a destination has an empty area in its priority queue from among the output side-addressed queue managers which output the output demand signals and in which priority/non-priority signals indicate the priority.

5. The relaying apparatus as claimed in claim 4 wherein the inter-output link manager selects a same output side-addressed queue manager a plurality of times within the fixed period.

6. The relaying apparatus as claimed in claim 1 wherein the input side accommodating portion assigns an identifier indicating the priority or non-priority respectively to the bandwidth guaranteed packet or bandwidth non-guaranteed packet, so that the output side accommodating portion recognizes a received packet as either of the bandwidth guaranteed packet or bandwidth non-guaranteed packet based on the identifier.

7. The relaying apparatus as claimed in claim 1 wherein the input side accommodating portions and the output side accommodating portions further manage the bandwidth guaranteed packet divided into a plurality of queues with a priority order.

8. The relaying apparatus as claimed in claim 1 wherein the input side accommodating portions and the output side accommodating portions manage the bandwidth non-guaranteed packet divided into a plurality of queues.

9. The relaying apparatus as claimed in claim 1 wherein the packet comprises an arbitrary length packet, and the output side-addressed queue managers insert one or more arbitrary length packets into the time slot.

10. The relaying apparatus as claimed in claim 9 wherein the time slot is divided into a plurality of sub-time slots, which are inserted with the packets.

11. The relaying apparatus as claimed in claim 1 wherein the priority and non-priority queues can simultaneously store the packets which simultaneously arrive within a same time slot from the input side accommodating portions.

12. The relaying apparatus as claimed in claim 3 wherein in the empty time slots generated within the fixed period, the selection is performed by a round-robin method unrestrained by the fixed period.

* * * * *